(12) United States Patent
Barrett (10) Patent No.: US 8,160,065 B2
(45) Date of Patent: Apr. 17, 2012

(54) DEVICE AND METHOD FOR DYNAMICALLY STORING MEDIA DATA

(75) Inventor: Timothy Alan Barrett, Kanata (CA)

(73) Assignee: Alcatel Lucent, Paris (FR)

( * ) Notice: Subject to any disclaimer, the term of this patent is extended or adjusted under 35 U.S.C. 154(b) by 642 days.

(21) Appl. No.: 11/402,708

(22) Filed: Apr. 12, 2006

(65) Prior Publication Data

US 2007/0242668 A1 Oct. 18, 2007

(51) Int. Cl.
*H04L 12/28* (2006.01)
*H04L 12/56* (2006.01)

(52) U.S. Cl. ........ 370/390; 370/412; 370/432; 709/231; 725/139

(58) Field of Classification Search ................. None
See application file for complete search history.

(56) References Cited

U.S. PATENT DOCUMENTS

| | | | | |
|---|---|---|---|---|
| 5,815,662 | A * | 9/1998 | Ong | 725/92 |
| 5,935,206 | A * | 8/1999 | Dixon et al. | 709/219 |
| 6,742,019 | B1 * | 5/2004 | Dan et al. | 709/213 |
| 6,757,796 | B1 * | 6/2004 | Hofmann | 711/159 |
| 6,804,824 | B1 | 10/2004 | Potrebic et al. | |
| 7,028,096 | B1 * | 4/2006 | Lee | 709/231 |
| 7,430,222 | B2 * | 9/2008 | Green et al. | 370/486 |
| 7,444,662 | B2 * | 10/2008 | Faibish et al. | 725/91 |
| 7,477,653 | B2 * | 1/2009 | Smith et al. | 370/432 |
| 7,499,408 | B1 * | 3/2009 | Black | 370/252 |
| 2003/0005457 | A1 * | 1/2003 | Faibish et al. | 725/94 |
| 2004/0034863 | A1 * | 2/2004 | Barrett et al. | 725/38 |
| 2005/0053086 | A1 * | 3/2005 | Mehta et al. | 370/432 |
| 2005/0081244 | A1 * | 4/2005 | Barrett et al. | 725/97 |
| 2006/0075428 | A1 * | 4/2006 | Farmer et al. | 725/38 |
| 2006/0200574 | A1 * | 9/2006 | Pickens et al. | 709/231 |
| 2006/0242554 | A1 * | 10/2006 | Gerace et al. | 715/501.1 |
| 2006/0268917 | A1 * | 11/2006 | Nadarajah | 370/432 |
| 2007/0121629 | A1 * | 5/2007 | Cuijpers et al. | 370/390 |
| 2007/0160038 | A1 * | 7/2007 | Liu et al. | 370/389 |
| 2008/0196061 | A1 * | 8/2008 | Boyce | 725/38 |

FOREIGN PATENT DOCUMENTS

EP 1 389 874 A2 2/2004

* cited by examiner

*Primary Examiner* — Robert Scheibel
(74) *Attorney, Agent, or Firm* — Eckert Seamans Cherin & Mellott, LLC (57) ABSTRACT

A device and a method for enabling access to data from a channel are provided. The device comprises a storage medium for storing the data from the channel as it is received at a network element and a controller. The controller enables commencing storage of at least a portion of multicast data from the channel not already stored on a storage medium as the data is received at a network element, after detecting a request to receive data from the channel. In the event of receiving a subsequent request associated with a user device to receive data from the channel, the data is transmitted from the storage medium to the user device. A controller for controlling storage of the data comprises a memory and a processor.

40 Claims, 9 Drawing Sheets

DEVICE AND METHOD FOR DYNAMICALLY STORING MEDIA DATA

FIELD OF THE INVENTION

The present invention relates to a method and device for enabling access to data from a channel. Furthermore, it relates to a controller for controlling storage of data from a channel on a storage medium.

BACKGROUND

In existing IP (Internet Protocol) TV broadcast networks, TV channels from one or more service providers are transmitted over the network to various access nodes located in residential or commercial neighborhoods and which provide a connection to each individual subscriber premises to providing selected TV channels and other services to subscriber equipment.

Typically, the transmission media between the access node and the subscriber premises has limited bandwidth and may, for example, comprise a wire line such as a twisted copper pair. Each access node typically receives all of the channels to which customers connected to the access node subscribe. In this case, only one or a few channels may be transmitted from the access node to each subscriber premises at any one time. Therefore, when a subscriber wishes to change to another channel that is not currently being transmitted to the subscriber equipment by the access node, the channel change is performed by the access node, rather than locally at the subscriber equipment.

To reduce the bandwidth required to transport video data, the data is typically compressed prior to transmission by a video compression algorithm such as the MPEG2 standard of the International Telecommunication Unions Moving Pictures Experts Group or the H.264 of the video coding experts group, which compress video into sequences known as groups of pictures (GOPs). Each GOP contains a portion of video data which, when displayed lasts for a fraction of a second to several seconds, and is defined by respective beginning and/or ending boundaries.

Each GOP begins with a reference frame and subsequent video data in the GOP defines successive changes to the reference frame, these changes providing the sequence of video images which are ultimately displayed. A reference frame is typically required by a decoder in order to enable the decoder to start decoding the compressed video data. Therefore, the longer the time interval between successive GOPs, the longer the delay between requesting a video channel and the channel being displayed, and this delay or latency can be quite perceptible.

In order to reduce video display latency when a channel change is effected, special devices may be deployed which are dedicated to providing a portion of a previously transmitted video stream, including a reference frame to each subscriber's decoder whenever a subscriber requests a channel change. The data is transmitted to each subscriber as a unicast transmission and enables the decoder to begin decoding the video data and displaying the video image in a shorter time than would otherwise be the case if the access node simply connected the decoder directly to the multicast data stream, as this may necessitate a delay before the image can be displayed of up to about the time length of a GOP if the channel change request does not coincide with the transmission of a reference frame in the requested channel. After the requisite portion of unicast video data has been received by the decoder, the access node joins the decoder to the multicast data stream and the video data from the multicast stream is displayed after the unicast video data.

Typically, unicast data sources required for fast channel change are deployed some distance from the access node and a subscriber premises and therefore a significant amount of network resources may be required to carry the unicast data. Furthermore, as a unicast data device provides unicast data to many different subscribers, the network resources may be required to transport a large amount of unicast data. As channel changes may be concentrated at particular times of the day, for example at 30 minute or hourly intervals that coincide with the beginning and ending of programs, the network may be required to carry large amounts of unicast data at the same time, causing a significant burden and possibly even exceeding the network capacity.

SUMMARY OF THE INVENTION

In one aspect of the present invention, there is provided a device for enabling access to data from a channel, the device comprising: a storage medium for storing the data from the channel as it is received at a network element; and a controller configured to enable the functions of: after detecting that data from the channel has been requested, the channel being a channel for which no data is presently stored on a storage medium, commencing storage of at least a portion of multicast data from the channel on the storage medium as the data is received at a network element; and in the event of receiving a subsequent request associated with a user device to receive data from the channel, transmitting the data from the storage medium to the user device.

An advantage realised by devices according to embodiments of the present invention is that the storage or caching of data is dynamic or on an as needed basis. That is, only channels for which the multicast data has been requested are stored. In some embodiments, the storage is started after receipt of an IGMP (Internet Group Management) report. In other embodiments it is started after detecting that the multicast data is being streamed to a user device. Once storage has started, all subsequent requests for data from the channel may be serviced by the storage medium. In some embodiments, the data is sent by unicast from the storage medium in response to the subsequent requests.

Embodiments of devices according to the present invention can be located at any network device or stand alone device. This has the advantage of being able to provide rapid channel change and retry functionalities closer to the user device thereby reducing the network resources required for unicasting the data.

In some embodiments the storage is commenced after detecting that multicast data from the channel has been requested.

In another aspect of the invention, there is provided a controller for controlling storage of data from a channel on a storage medium, the controller comprising: a memory for storing a number of user devices that are receiving data from each of a plurality of channels and a list of channels that are presently being stored on a storage medium; a processor configured to, after detecting that data from the channel has been requested, the channel being a channel not on the list of channels being stored, implement a method comprising: storing multicast data from the channel on the storage medium; and if the storage medium has reached a maximum capacity, determining which channel is being received by the least number of user devices and discontinuing to store the channel being received by the least number of user devices.

In still another aspect of the present invention, there is provided a method for providing one or more user devices with data from a channel, the method comprising: after detecting that data from the channel has been requested, the channel being a channel for which no data is presently stored on a storage medium, commencing storage of at least a portion of multicast data from the channel on the storage medium as the data is received at a network element; in the event of receiving a subsequent request associated with a user device to receive data from the channel, transmitting the data from the storage medium to the user device.

Other aspects and features of the present invention will become apparent, to those ordinarily skilled in the art, upon review of the following description of the specific embodiments of the invention.

BRIEF DESCRIPTION OF THE DRAWINGS

Examples of embodiments of the invention will now be described in greater detail with reference to the accompanying drawings, in which.

DETAILED DESCRIPTION OF THE PREFERRED EMBODIMENTS

Figure 1:
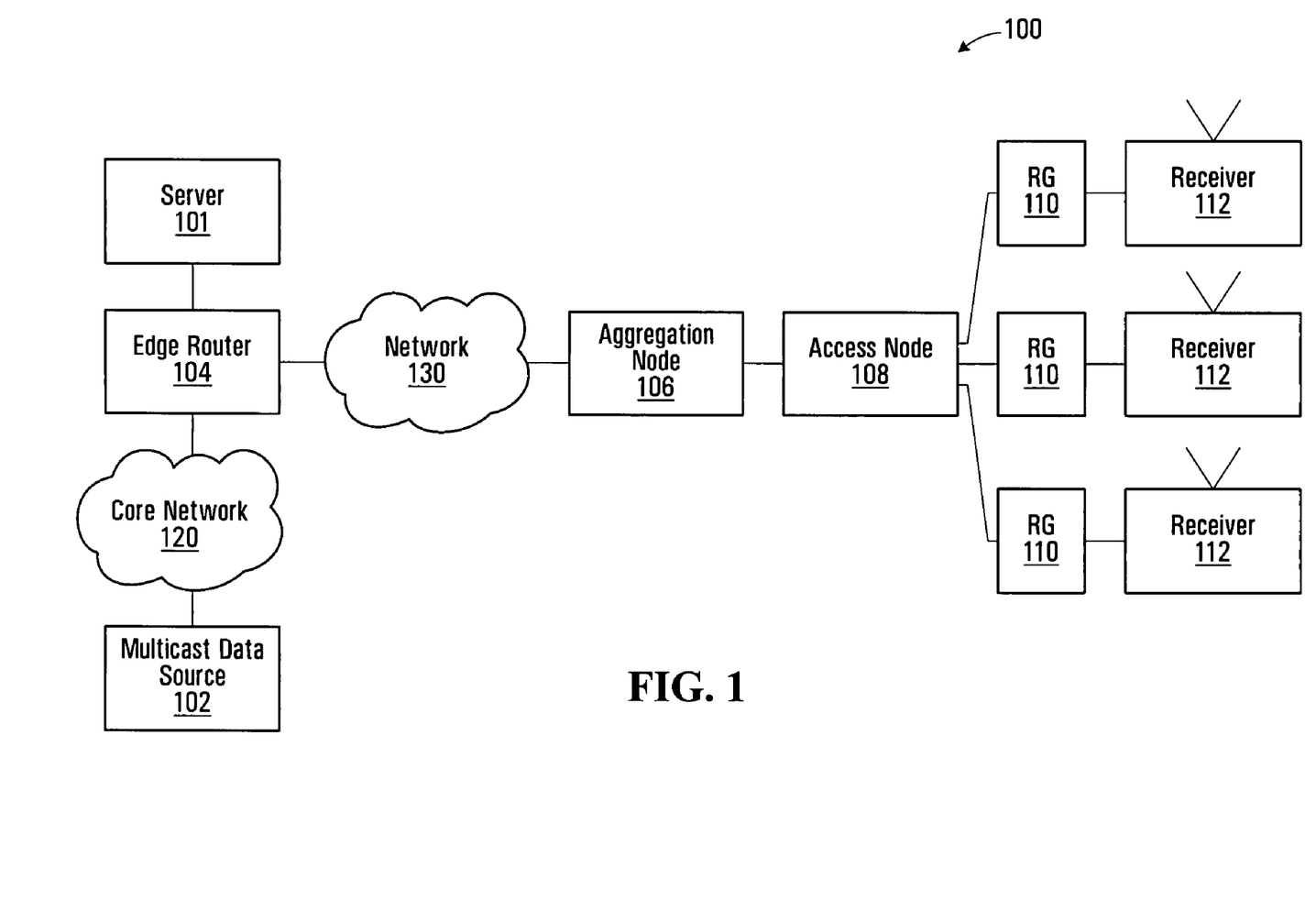
FIG. 1 is a block diagram of a system for transmitting multicast data over a network.

Devices according to embodiments of the present invention may exist in the context of a telecommunications provider network, though they can operate in any system for transmitting multicast data over a network, such as an ethernet, the Internet, a WAN (Wide Area Network) or a LAN (Local Area Network). Referring to FIG. 1, an example of such a system 100 comprises a multicast data source 102 for the data, which sends the data through a core network 120 via one or more edge router(s) 104 (one shown) to a telecommunications provider network 130. The source 102 is any source from which multicast data originates. Some non-limiting examples comprise a satellite, a video camera, a computer and an audio transmitter. The data from the source 102 is compressed and sent through the system via multicast. From the network 130, the data is directed to receivers 112 through one or more aggregation node(s) 106 (one shown), one or more access node(s) 108 (one shown) and residential gateways 110.

The residential gateway 110 is a device that is typically located at the user's premises and is a gateway between the telecommunications provider network 130 and the user device's home network. The residential gateway 110 may include functions such as firewall, NAT (Network Address Translation), and DHCP (Dynamic Host Control Protocol) server. All traffic to/from each receiver 112 flows through its respective residential gateway 110 to reach the network 130.

The access node 108 is a device connecting the network 130 to the customers homes, through the residential gateways 110. The access node may use technologies such as xDSL (Digital Subscriber Line variants), Fiber to the Node, etc.

The aggregation node 106 is a device to which a plurality of access nodes 108 are connected. The aggregation nodes 106 then all connect to the edge routers 104 that provide routed connectivity into the core network 120.

The edge router 104 is typically defined as being the first routed point in the network from the user device's perspective. The edge router 104 connects the core network 120 to the aggregation nodes 106.

The system 100 also comprises one or more server(s) 101 (one shown) dedicated to storing data from prescribed channels. The server 101 serves a function of providing rapid channel changing for multicast video streams. When a channel change is requested, the server 101 is sent a request for recently cached data. In response the server 101 sends the data from the requested channel to the receiver 112 via unicast until such time as the receiver has enough information to join the multicast stream for the channel. The server 101 can also service retry requests to recover data packets lost from the multicast data. The server 101 is typically connected to the core network 120 and the telecommunications provider network 130 via the edge router 104.

Another solution locates the rapid channel change function closer to the user devices, such as on access nodes. This reduces the network resources required for unicasting. Additionally, if all the channels that arrive at the access node are cached, then the cache may also service retry requests for those channels. However, if the channels to be cached are allocated statically, there is a requirement for bandwidth to be specifically allocated to provide the channels to the cache. As a result, the bandwidth savings generated from the cache are offset by the static allocation to the network element on which the cache is located.

It is to be understood that FIG. 1 is illustrative only and that the system 100 can comprise any number of each network element, or may have a significantly different architecture. For example, an aggregation node 106 can service many access nodes 108 and the residential gateways 110 may service any number of receivers 112. Furthermore, the system 100 described with reference to FIG. 1 is simply one example of a system in which the present invention can operate. Embodiments of the invention can operate in any network environment in which data is broadcast from a source to user devices over a network.

Embodiments of the present invention provide a means for dynamically caching multicast data from channels at a location closer to the user device than the server 101 and for providing the data via unicast to one or more user devices, such as the receivers 112. Any network element, such as an access node 108 or an aggregation node 106, in the system

100 may be configured to carry out methods for enabling access to data from a channel according to embodiments of the present invention.

Figure 2:
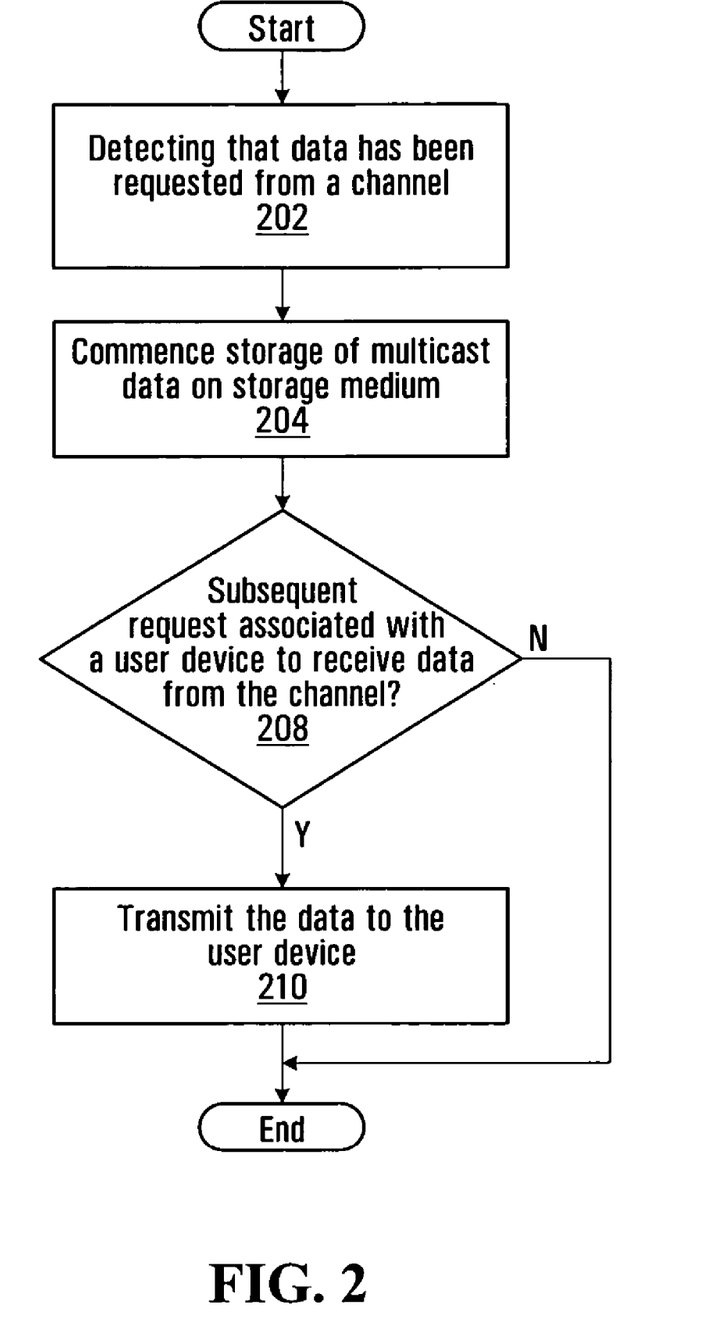
FIG. 2 is a flowchart of a method for providing data from a channel according to one embodiment of the present invention.

FIG. 2 is a flowchart of one method according to an embodiment of the present invention. A method for providing one or more user devices with data from a channel starts with a Step 202 which comprises detecting that data from the channel has been requested, the channel being a channel for which no data is presently stored on a storage medium. In some embodiments of the invention, the storage medium is part of a dynamic storage device or a dynamic rapid channel change device. In some embodiments, the storage is commenced after detecting that multicast data from the channel has been requested. In some embodiments, the storage is commenced after detecting that an IGMP (Internet Group Management) report has been received at a network element. In other embodiments, a network element tracks all of the multicast channels being received by user devices connected to that network element. Therefore in some embodiments, the storage may commence after detecting that the channel is being received by at least one of the user devices. In other embodiments, the storage is commenced after detecting a request to receive the data from the channel via unicast.

After receiving the request, Step 204 is implemented, which comprises commencing storage of at least a portion of multicast data from the channel on the storage medium as the data is received at a network element. Therefore, when multicast data from a channel that is not already on the storage medium is requested, the storage of the data stream for that channel is started. In some embodiments the storage starts after the multicast data is received by at least one user device.

In the event of receiving a subsequent request associated with a user device to receive data from the channel (Step 208), the method continues with Step 210 which comprises transmitting the data from the storage medium to the user device. In some embodiments, the transmission is via unicast.

In an IPTV application, an embodiment of a method according to the present invention starts with a client device sending a request for channel to a rapid channel change server, such as server 101 described with reference to FIG. 1. The rapid channel change server sends the data for each requested channel to the client device via unicast. This continues until the user settles on a channel. In some embodiments, there are criteria, such as predetermined period of time with no channel change, or a certain level of buffer fullness, for determining if the user has settled on a channel. When the user settles, an IGMP report is issued by the client device to join the multicast stream for the channel. This triggers the channel to be added to the list of channels to be cached by the storage medium. Subsequent requests for that channel will be serviced by unicasting the data from the storage medium.

In some embodiments, the data is transmitted to the user device at a speed faster than real time and a controller tells the client to switch over to multicast when the transmitted data has caught up to real time. In further embodiments, the data is transmitted to the user device from the storage medium as unicast until the user device receives the data from the channel as a multicast data stream.

In some embodiments, the delivery of unicast to the user device may continue until some other condition is met or indefinitely. In this instance, devices implementing the method could be used specifically to take multicast in and deliver unicast streams to user devices.

The subsequent request at Step 208 may be a request for one or more specific data packet(s) from the data stream. This enables user devices to recover lost data packets. For example, a user device that is receiving a multicast data stream may not receive a particular packet or may receive a corrupted packet. The packets in the data stream are numbered, so the user device can request the missing or corrupted packet by number. Because it is a data stream already being stored on the storage medium, the lost or damaged packet can be replaced with the corresponding stored packet. In a preferred embodiment, all streams multicast to user devices will be cached and therefore all retries will be serviced from the storage medium.

In some cases where the channel is a video stream, transmitting the data comprises sending data from the storage medium commencing at a reference frame.

In some embodiments, the portion of the data stream comprises a predetermined number of most recently received packets of data from the data stream.

Figure 3:
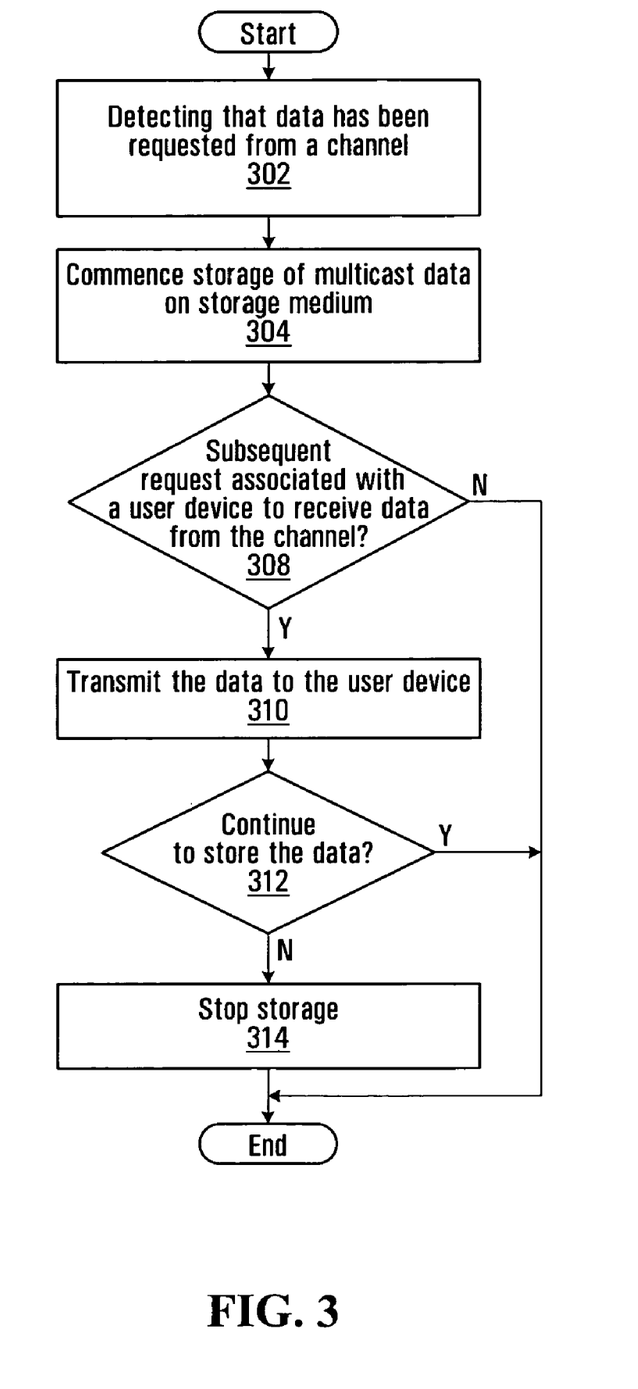
FIG. 3 is a flowchart of a method for providing data from a channel according to one embodiment of the present invention.

Storage mediums have limited capacities and therefore, it may be necessary to make a decision about whether or not to continue to store data from the channel. FIG. 3 is a flowchart of a method in which this decision is made. The method starts with Steps 302, 304, 308 and 310 which are the same as Steps 202, 204, 208 and 210, respectively, of the method described with reference to FIG. 2. The next step, Step 312, is different and comprises deciding whether or not to continue to store the data from the channel. If the decision is yes, then the method ends. In some embodiments, if there is a decision to discontinue storage of data from a channel, then storage of the data from that channel is stopped (Step 314).

In some embodiments, the determining is based on at least one of storage capacity of the storage medium, status of the storage medium, status of a device for controlling the storage medium and a number of user devices requesting the data stream.

In some embodiments, information identifying the channels for which data is currently stored in the storage medium is monitored and a current channels list may be generated and stored in a memory, for example. This information can be used to determine whether the storage medium can service a particular data request, and whether to forward the data request to another request service device. The channels list can be updated regularly, for example, continually or on a periodic basis.

One or more other parameters or conditions may be monitored and also used in determining whether to continue to store data from a particular channel. Examples of parameters or conditions that may be monitored include available bandwidth of one or more egress interface(s) on a network element and/or available bandwidth or capacity of any one or more of ingress interface(s) on a network element, a number of data requests received within a predetermined timeframe, status of the storage medium and/or a device for controlling the storage medium, for example whether the device is operating correctly or whether a malfunction, fault or failure has been detected, the available processing power to service the request(s) and/or the status of another data request service device.

Another aspect of the invention is a device for enabling access to data from a channel. One embodiment of such a device will now be described with reference to FIG. 4. The device 400 comprises a storage medium 402 for storing the data from the channel as it is received at a network element and a controller 404. The device 400 can communicate either directly or indirectly with a data source 408. For example, the device may forward requests for multicast data to the data source 408 through a system, such as the one described with reference to FIG. 1. The controller 404 sends requests to the data source 408 and the storage medium 402 receives data from the data source 408. The device 400 also communicates either directly or indirectly with one or more user device(s) 406. The controller 404 communicates either directly or indirectly with the user device 406 to receive confirmation that a request has been made for the user device to receive multicast data from a channel and to receive subsequent requests for data from the channel. In response to the subsequent requests, data on the storage medium 402 is sent to the user device.

Figure 4:
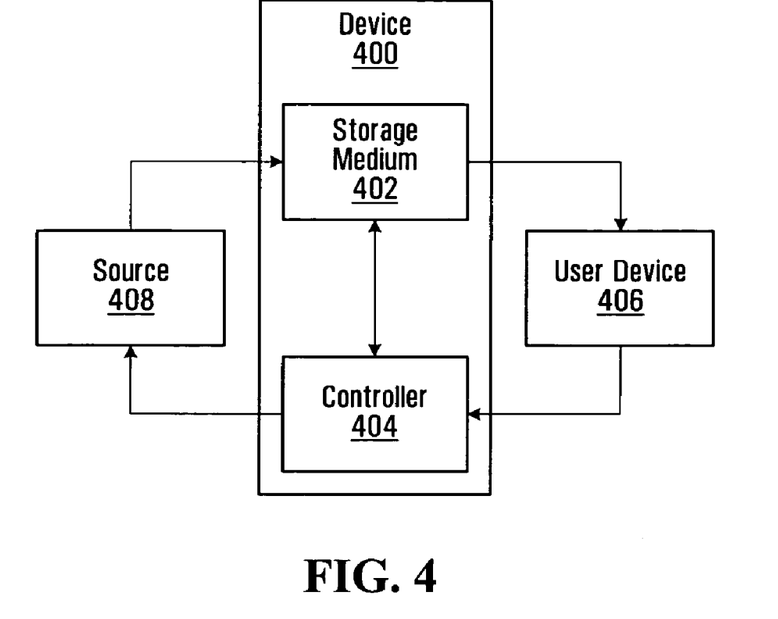
FIG. 4 is a functional block diagram of a device for enabling access to data from a channel according to one embodiment of the present invention.

In some embodiments the controller 404 is configured to implement the functionality of methods, such as those described with reference to FIGS. 2 or 3. In an examplary embodiment, after detecting that multicast data from a channel has been requested, the channel being a channel for which no data is presently stored on the storage medium 402, the controller 404 causes the device 400 to commence storage of at least a portion of the data from the channel on the storage medium 402 as the data is received at a network element. Then, in the event of receiving a subsequent request associated with a user device 406 to receive data from the channel, the device 400 transmits the data from the storage medium 402 to the user device 406.

The storage medium 402 may be configured, for example, as a circular buffer or a delay line. The storage medium 402 is any medium that can store data. Non-limiting examples include RAM, a hard-drive, and cache memory.

In some embodiments the device 400 also comprises a memory accessible by the controller 404 having a list of channels for which data is stored on the storage medium 402 and a list of user devices 406 receiving data from each channel. The information in this memory may be used to determine if the channel is a channel for which no data is presently stored on the storage medium 402. Another use for the information is to determine which channel to stop storing on the storage medium 402 if the storage medium 402 reaches a maximum capacity.

The controller 404 of some embodiments comprises a memory having instructions stored thereon for implementing the steps. In still other embodiments, the controller 404 further comprises a processor for carrying out the instructions stored on the memory.

Other embodiments of the device 400 comprise an input for receiving the data from the channel via multicast from the data source 408 and an output for transmitting the data to the user device 406 via unicast.

In embodiments where the data is a video stream, the controller is configured to transmit the data starting with a reference frame.

The device 400 can be located on any network element or as a stand-alone device in the network. Non-limiting locations for the device 400 comprise an access node, an aggregation node and a residential gateway.

Figure 5:
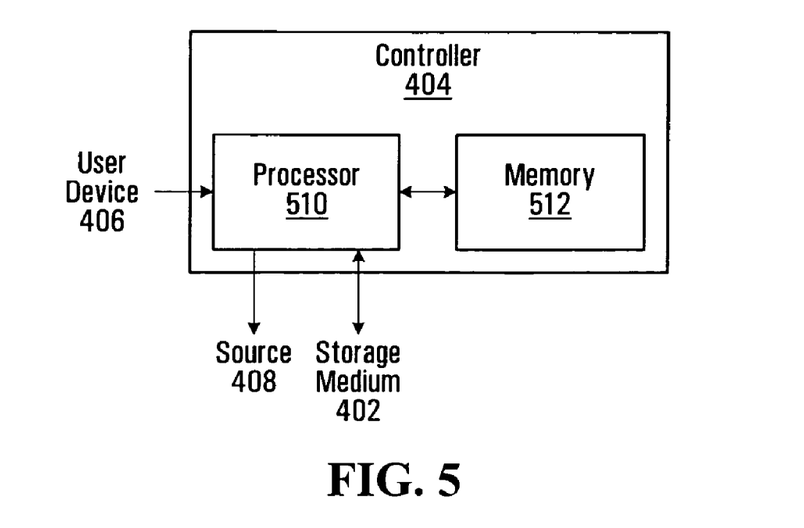
FIG. 5 is a functional block diagram of a controller according to one embodiment of the present invention.

FIG. 5 is a functional block diagram of an embodiment of a controller in accordance with the present invention. The controller 404, in this embodiment, is for controlling storage of data from a channel on the storage medium 402. The controller comprises a memory 512 for storing a number of user devices that are receiving data from each of a plurality of channels and a list of channels that are presently being stored on the storage medium 402. The controller 404 also comprises a processor 510 configured to implement a method, after detecting that multicast data from a channel has been requested, the channel being a channel not on the list of channels being stored. The first step of the method implemented by the processor 510 is to store data from the channel on the storage medium 402. If the storage medium 402 has reached a maximum capacity, the controller 404 determines which channel is being received by the least number of user devices 406 and discontinues storage of data from the channel being received by the least number of users. If more than one channel has the least number of users, in some embodiments, the controller makes a further determination as to which of the channels with the least number of users has declined in popularity the fastest and that becomes the channel that will be dropped from storage. It is to be understood that this is only one embodiment of the controller 404 and other configurations may exist.

In some embodiments of the controller 404, the memory 512 also stores instructions for implementing the method and the processor 510 accesses the instructions on the memory 512.

In some embodiments, the controller 404 will monitor the channels being used and decide to stop storing data from a channel if no user devices are presently receiving data from the channel. In other embodiments, this decision to stop storing is based on non-use of the channel for a predetermined period of time.

The device 400 and the controller 404 can be built using any combination of hardware and software designed to implement the functions described herein. For example, the processor 512 could comprise a computer processor such as an INTEL™ processor or it can be comprised of hardware to perform the core functions or in some cases all of the functions. In some embodiments software is also used in combination with the hardware.

As mentioned herein, the device 400 of the present invention can be implemented on any network element or in a stand-alone device. In order to illustrate that different implementations are possible on the same network element, three possible implementations on an access network element will now be described with reference to FIGS. 6, 7 and 8. These are only specific implementation of access network elements and reflect an architecture that may be used for access nodes, such as DSLAMs (Digital Subscriber Line Access Multiplexers). The device 400 is equally applicable to other environments, such as for example, optical networks or Fibre to Node environments, where the device 400 can be located at an ONT (Optical Network Termination) or on a line termination system.

Figure 6:
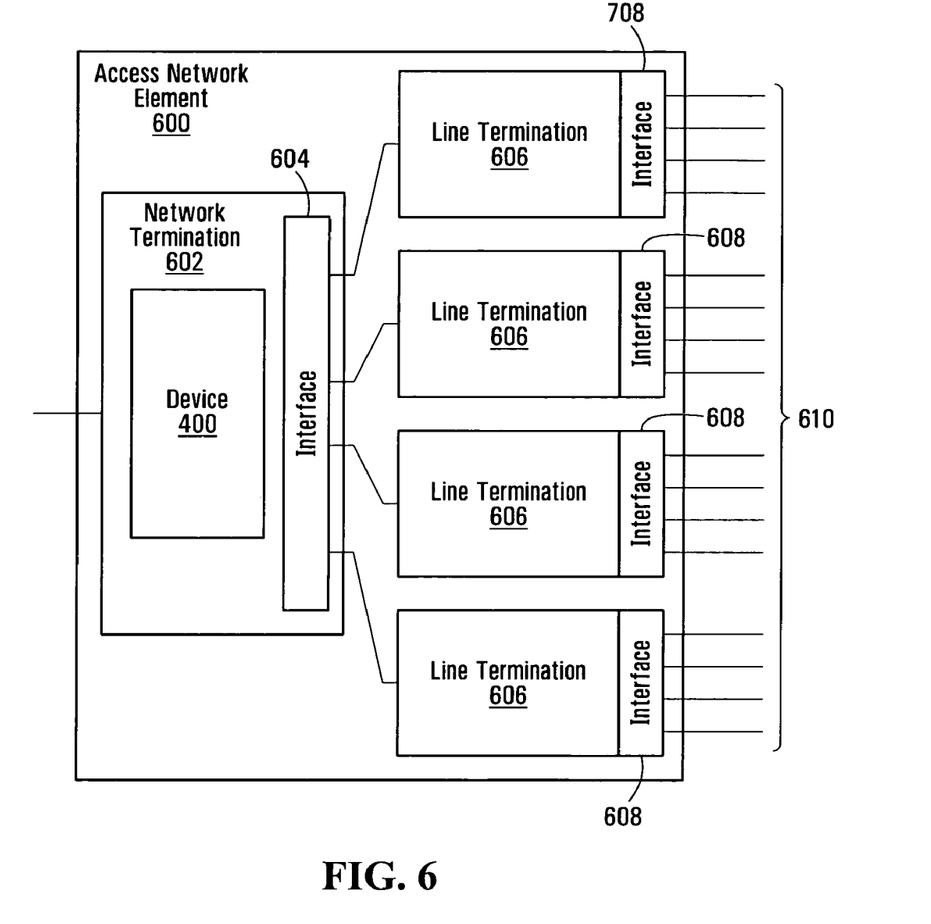
FIG. 6 is a functional block diagram of an access network element according to one embodiment of the present invention.

Starting with FIG. 6, an exemplary access network element 600 comprises a network termination device 602 and a plurality of line termination devices 606. The network termination device 602 transmits and receives data to and from other network elements and also comprises an interface 604 to enable communication with the plurality of line termination devices 606. Each line termination device 606 comprises an interface 608 comprising a plurality of ports 610 for connection to network termination equipment. The network termination equipment may be, for example, ONTs (Optical Network Terminations), XDSL modems, residential gateways, etc. In this embodiment of the access network element 600, the device 400 is located on the network termination device 602. In this configuration, only one device 400 is required for the access network element 600 and that device 400 controls the storage of data from channels in response to requests associated with any customer premises equipment connected directly or indirectly to the line termination devices 606 through ports 610 and interfaces 608.

In some embodiments, the device 400 is built into the network termination portion of the access node 602. In other embodiments, the device 400 is an add on option on the network termination device 602, where the network termination device is designed to allow other devices to plug into the access network element 600. This may be in the form of a daughter board.

Figure 7:
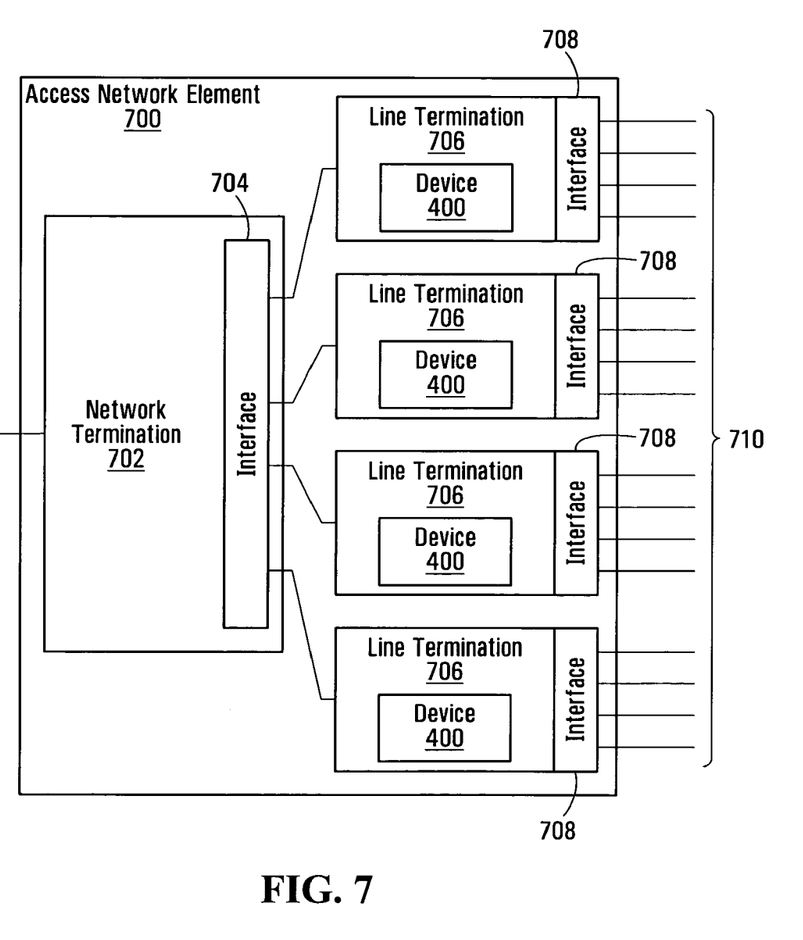
FIG. 7 is a functional block diagram of an access network element according to one embodiment of the present invention.

Referring now to FIG. 7, another exemplary access network element 700 comprises a network termination device 702 and a plurality of line termination devices 706. The network termination device 702 transmits and receives data to and from other network elements and also comprises an interface 704 to enable communication with the plurality of line termination devices 706. Each line termination device 706 comprises an interface 708 comprising a plurality of ports 710 for connection to customer premises equipment. In this embodiment of the access network element 700, a device 400 is located on each line termination device 702.

Figure 8:
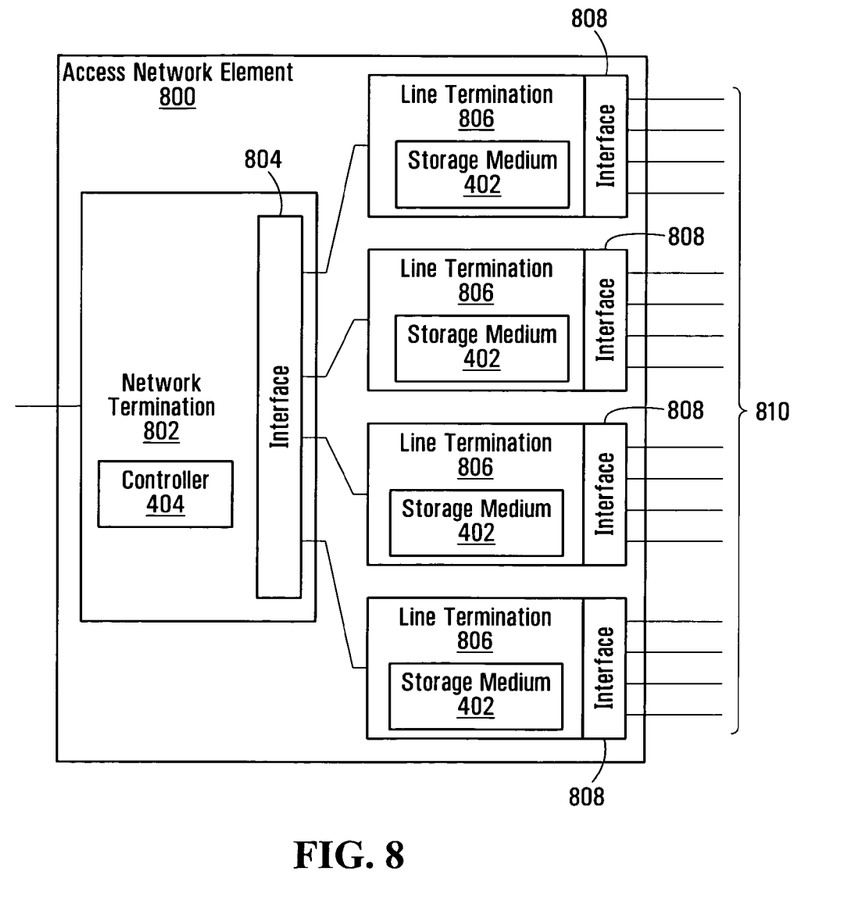
FIG. 8 is a functional block diagram of an access network element according to one embodiment of the present invention.

Referring now to FIG. 8, another exemplary access network element 800 comprises a network termination device 802 and a plurality of line termination devices 806. The network termination device 802 transmits and receives data to and from other network elements and also comprises an interface 804 to enable communication with the plurality of line termination devices 806. Each line termination device 706 comprises an interface 808 comprising a plurality of ports 810 for connection to customer premises equipment. In this embodiment, the device 400 is divided between the network termination device 802 and the line termination devices 806. The controller 404 is located on the network termination device 802 and a storage medium 402 is located on each line termination device.

Figure 9:
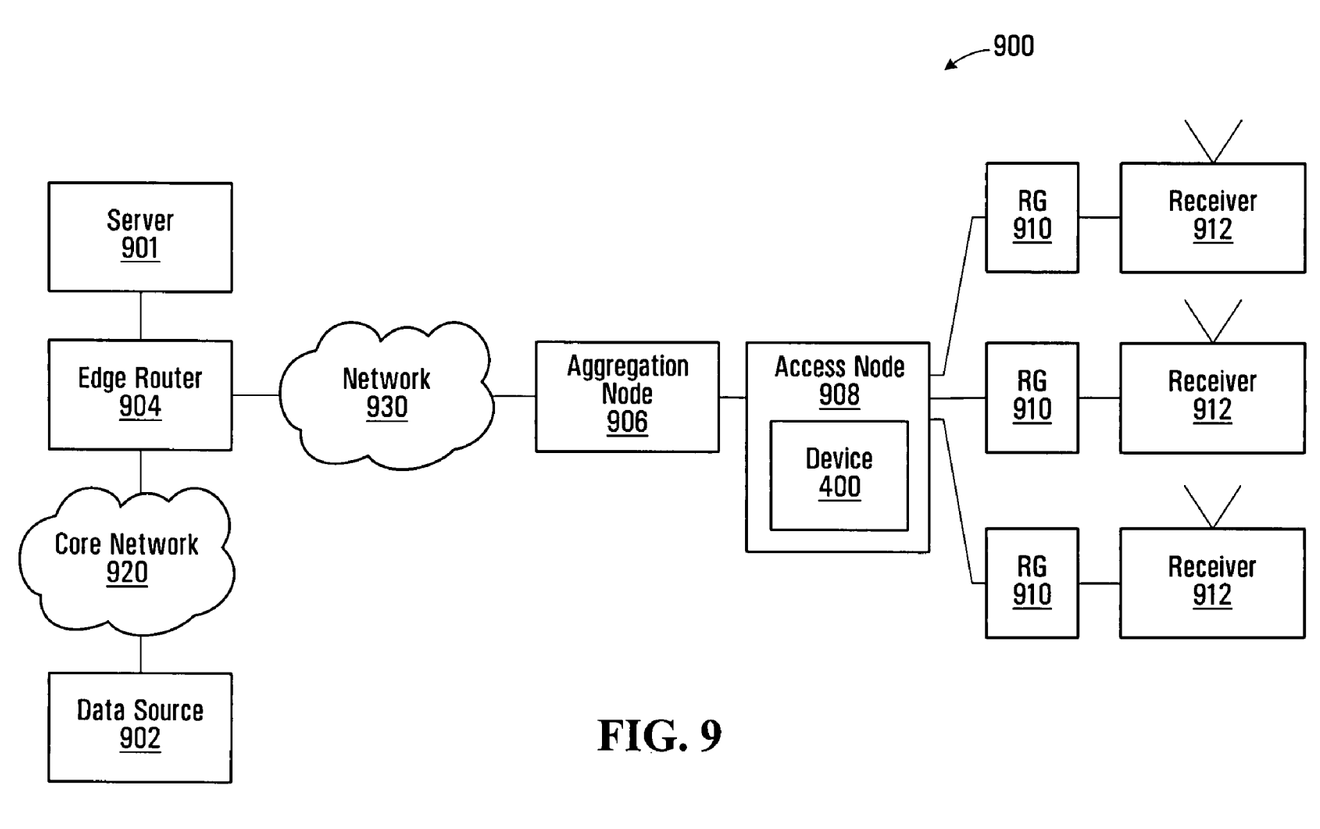
FIG. 9 is a block diagram of a system for transmitting multicast data over a network according to one embodiment of the present invention.
Figure 10:
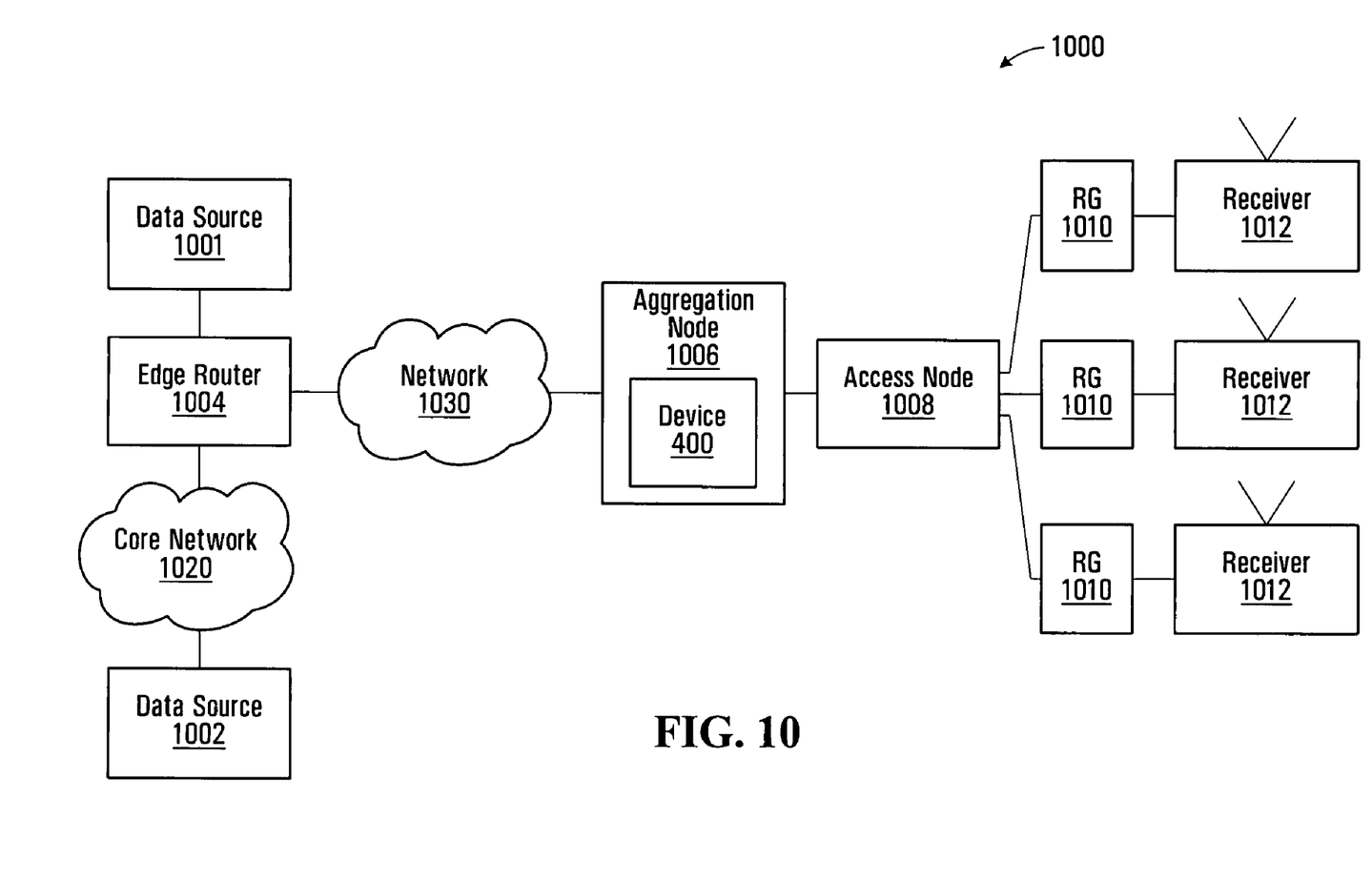
FIG. 10 is a block diagram of a system for transmitting multicast data over a network according to one embodiment of the present invention.

The embodiments of systems presented in FIGS. 9 and 10 are illustrative of the fact that the device can be located on different network elements. Referring to FIG. 9, a system 900 comprises a source 902 for the data, which sends the data through a network 930 via a core network 920 and an edge router 904. From the network 930, the data is directed to receivers 912 through an aggregation node 906, an access node 808 and residential gateways 910. These components perform similar functions to the components of the system 100 described with reference to FIG. 1. In the system 900, the device 400 is located on the access node 908.

Referring to FIG. 10, a system 1000 comprises a source 1002 for the data, which sends the data through a network 1030 via a core network 1020 and an edge router 1004. From the network 1030, the data is directed to receivers 1012 through an aggregation node 1006, an access node 1008 and residential gateways 910. These components perform similar functions to the components of the system 100 described with reference to FIG. 1. In the system 1000, the device 400 is located on the aggregation node 1006.

The embodiment of FIG. 10 has the advantage of serving more receivers with a device 400 than the embodiment described with reference to FIG. 9, because an aggregation node can service more than one access node. However, the embodiment described with reference to FIG. 9 brings the decision to cache a channel closer to the receivers, thereby reducing the distance over which the data is unicast to the receivers. Therefore, the embodiment of FIG. 9 uses less bandwidth for more of the path of the channel through the system.

In some embodiments, requests for channel changes are passed on to another network element. That network element may comprise custom hardware to service these requests, thus creating a platform to allow all channels in a lineup to be cached at a location such as the Central Office. This system could appear to a video platform as an ordinary rapid channel change device, but with much greater capabilities. There is also the possibility of associating these systems with additional caching capability in access nodes. According to this embodiment, the hardware platform is capable of caching multiple Gbits of ingress multicast traffic and delivering substantially more unicast streams starting with the beginning of the most recent GOP than a software based system could handle.

What has been described is merely illustrative of the application of the principles of the invention. Other arrangements and methods can be implemented by those skilled in the art without departing from the spirit and scope of the present invention.

The invention claimed is:

1. A device for enabling access to data from a channel, the device comprising:
    a storage medium for storing multicast data from the channel as it is received at an access network element; and
    a controller configured to enable the functions of:
    after detecting at the access network element that multicast data from the channel has been requested, the channel being a channel for which no data is presently stored on a storage medium, commencing storage of at least a portion of the multicast data from the channel on the storage medium as the multicast data is received at the access network element; and
    in the event of receiving at the access network element a subsequent request associated with a user device to receive data from the channel, transmitting the data from the storage medium to the user device via unicast until a condition is met indicating that a user of the user device has settled on the channel, and in response to said condition being met, ceasing said unicast transmission and commencing transmission of data from said channel to said user device via multicast, wherein said condition is met if a buffer of the user device which receives the unicast data reaches a predetermined level sufficient to indicate that the user has settled on the channel.

2. The device of claim 1, wherein the storage medium is configured as a circular buffer or a delay line.

3. The device of claim 1, further comprising a memory accessible by the controller having a list of channels for which data is stored on the storage medium and a list of user devices receiving data from each channel.

4. The device of claim 1, further comprising an input for receiving the data from the channel via multicast and an output for transmitting the data to the user device via unicast.

5. The device of claim 1, wherein the data from the channel is a video stream.

6. The device of claim 5, wherein the controller is configured to transmit data which starts with a reference frame.

7. An access network element comprising the device of claim 1.

8. A controller for controlling storage of data from a channel on a storage medium on an access network element, the controller comprising:
    a memory for storing the identity of each of a number of user devices that are receiving multicast data from each of a plurality of channels and a list of channels that are presently being stored on a storage medium;
    a processor configured to, after detecting at the access network element that multicast data from the channel has been requested, the channel being a channel not on the list of channels being stored, implement a method comprising:
    storing multicast data from the channel on the storage medium;
    in response to detecting a subsequent request associated with a user device for multicast data from the channel, commencing transmission of the data from the channel via unicast lasting until a condition is met indicating that a user of the user device has settled on the channel, and in response to said condition being met, ceasing said unicast transmission and commencing transmission of data from said channel to said user device via multicast, wherein said condition is met if a buffer of the user device which receives the unicast data reaches a predetermined level sufficient to indicate that the user has settled on the channel, and if the storage medium has reached a maximum capacity, determining which channel is being received by the least number of user devices and discontinuing to store the channel being received by the least number of user devices.

9. The controller of claim 8, wherein the memory also stores instructions for implementing the method and the processor accesses the instructions on the memory.

10. A method for providing one or more user devices with data from a channel, the method comprising:

after detecting at an access network element that multicast data from the channel has been requested, the channel being a channel for which no data is presently stored on a storage medium on the access network element, commencing storage of at least a portion of multicast data from the channel on the storage medium as the multicast data is received at the access network element;

in the event of receiving a subsequent request associated with a user device to receive multicast data from the channel, transmitting the data from the storage medium to the user device via unicast until a condition is met indicating that a user of the user device has settled on the channel, and in response to the condition being met, ceasing said unicast transmission and commencing transmission, from said access network element, of data from said channel to said user device via multicast, wherein said condition is met if a buffer of the user device which receives the unicast data reaches a predetermined level sufficient to indicate that the user has settled on the channel.

11. The method of claim 10, wherein the storage is commenced after receiving confirmation that the multicast data is being received by at least one user device.

12. The method of claim 10, wherein the storage is commenced upon receipt of an IGMP (Internet Group Management Protocol) report requesting the multicast data.

13. The method of claim 10, wherein the subsequent request is for one or more specific data packet(s) from the channel.

14. The method of claim 10, wherein the channel comprises a video data stream and transmitting the data via unicast comprises transmitting data from the channel commencing at a reference frame.

15. The method of claim 10, further comprising determining whether or not to continue to store the data from the channel.

16. The method of claim 15, wherein the determining is based on at least one of storage capacity of the storage medium, status of the storage medium, status of the network element and a number of user devices presently receiving the data from the channel.

17. The method of claim 10, wherein the portion of the data comprises a predetermined number of most recently received packets of data from the channel.

18. The device of claim 1 wherein the access network element comprises at least one of an access node, an aggregation node and a residential gateway.

19. The controller of claim 8, wherein the access network element comprises at least one of an access node, an aggregation node and a residential gateway.

20. The method of claim 10, wherein the access network element comprises at least one of an access node, an aggregation node and a residential gateway.

21. The access network element of claim 7, comprising a plurality of line termination devices and a network termination device.

22. The access network element of claim 21, wherein the device for enabling access to data from a channel is located on each of the plurality of line termination devices.

23. The access network element of claim 21, wherein the device for enabling access to data from a channel is located on the network termination device.

24. The access network element of claim 21, wherein the controller is located on the network termination device and the storage medium is located on each of the plurality of line termination devices.

25. The access network element of claim 7 comprising a Digital Subscriber Line Access Multiplexer (DSLAM).

26. The device as claimed in claim 1, wherein said controller is adapted to instruct said user device to switch from said unicast transmission of data to said multicast transmission of data from said channel when said condition is met.

27. The device as claimed in claim 1, wherein said controller is adapted to control transmission, from said storage medium, of data specified by and to said user device in response to a request from said user device for said specified data.

28. The device as claimed in claim 27, wherein said specified data is data previously requested by said user device, but the data associated with the previous request was one or both of (1) corrupted, and (2) not received by said user device.

29. The device as claimed in claim 28, wherein said previously requested data was part of a multicast stream of data directed to said user device.

30. The controller as claimed in claim 8, wherein said processor is further configured to determine, in the event that more than one channel has the least number of users, which of said channels has declined in popularity fastest, and to discontinue to store the channel whose popularity has declined fastest.

31. The method as claimed in claim 10, further comprising instructing said user device to switch from said unicast transmission of data to said multicast transmission of data when said condition is met.

32. The method of claim 10, further comprising transmitting from said storage medium data specified by and to said user device in response to a request from said user device for said specified data.

33. The method as claimed in claim 32, wherein said specified data is data previously requested by said user device, but the data associated with the previous request was one or both of (1) corrupted, and (2) not received by said user device.

34. The method as claimed in claim 33, wherein said previously requested data was part of a multicast stream of data directed to said user device.

35. The method as claimed in claim 15, further comprising storing data from one or more other channels on said storage medium, wherein said determining comprises, in the event that said channel and at least one other channel whose data is stored on said storage medium has the least number of users, determining which of said channels has declined in popularity fastest, and discontinuing to store the channel whose popularity has declined fastest.

36. An access network element comprising:
a network termination device adapted for connection to a communication network;

a plurality of line termination devices each adapted for connection to a respective user device;

a storage medium for storing multicast data from a channel as it is received by said network element; and a controller configured to enable the functions of:

after detecting that multicast data from the channel has been requested, the channel being a channel for which no data is presently stored on said storage medium, commencing storage of at least a portion of the multicast data from the channel on the storage medium as the multicast data is received at the access network element; and in the event of receiving at the access network element a subsequent request associated with a user device to receive data from the channel, transmitting the data from the storage medium to the user device via unicast until a condition is met indicating that a user of the user device has settled on the channel, and in response to the condition being met, ceasing said unicast transmission and commencing transmission from said access network element of data from said channel to said user device via multicast, wherein said condition is met if a buffer of the user device which receives the unicast data reaches a predetermined level sufficient to indicate that the user has settled on the channel.

37. The access network element as claimed in claim 36, wherein said network termination device includes said storage medium and said controller.

38. The access network element as claimed in claim 36, wherein each of said plurality of line termination devices comprises a storage medium for storing multicast data and a controller configured to enable said functions.

39. The access network element as claimed in claim 36, wherein said network termination device comprises said controller, and each of said line termination devices includes a storage medium for storing multicast data.

40. The method as claimed in claim 10, comprising transmitting by unicast from a channel change server to a user device data from said channel in response to the detected request.

* * * * *